United States Patent [19]

Hutter, III et al.

[11] Patent Number: 5,013,391
[45] Date of Patent: May 7, 1991

[54] ADHESIVE NUTPLATE ASSEMBLY FOR MOUNTING

[75] Inventors: Charles G. Hutter, III, Carson City; Alexander B. Carter, III, Gardnerville, both of Nev.

[73] Assignee: Physical Systems, Inc., Carson City, Nev.

[21] Appl. No.: 364,105

[22] Filed: Jun. 12, 1989

[51] Int. Cl.$^5$ .............................. F16B 37/04
[52] U.S. Cl. ...................... 156/578; 516/71; 29/281.1; 29/451; 29/468; 269/48.1; 24/297; 24/453; 411/508; 411/907
[58] Field of Search .................. 156/91, 293, 578, 71; 411/500, 501, 508, 900, 902, 903, 907; 428/99; 52/366; 244/125, 126; 24/297, 453; 29/281.1, 451, 468; 269/48.1, 49, 52

[56] References Cited

U.S. PATENT DOCUMENTS

| | | | |
|---|---|---|---|
| 3,102,447 | 9/1963 | Gregory et al. | 29/468 X |
| 4,723,351 | 2/1988 | Danloup | 29/451 |
| 4,761,105 | 8/1988 | Gardner | 411/501 X |
| 4,815,906 | 3/1989 | Binns | 411/902 X |
| 4,817,264 | 4/1989 | Worthing | 411/501 X |
| 4,818,824 | 4/1989 | Dixit et al. | 24/453 X |
| 4,840,522 | 6/1989 | Kurihara | 411/903 X |
| 4,938,645 | 7/1990 | Wollar | 411/508 |

Primary Examiner—Michael W. Ball
Assistant Examiner—Mark A. Osek
Attorney, Agent, or Firm—Kelly Bauersfeld & Lowry

[57] ABSTRACT

An improved adhesive mounted nutplate assembly and related installation method are provided for secured mounting of a nutplate or the like onto a substrate, particularly at a blind side of the substrate in alignment with an access opening. The nutplate assembly includes a nut member having a resilient fixture pin received therein, with the nut member being adapted for adhesive mounting onto the blind side of the substrate with the fixture pin extending through the access opening. A pulling force applied to the fixture pin draws the nut member with a positive force against the substrate. The fixture pin is sized to bind within the access opening when released to maintain this positive force for the duration of an adhesive cure period, after which the fixture pin can be forcibly drawn through and removed from the nut member. A preferred nut member comprises a nutplate having a floating nut carried by a base which is adapted for adhesive mounting onto the substrate. An improved adhesive applicator is also disclosed.

22 Claims, 4 Drawing Sheets

FIG. 1
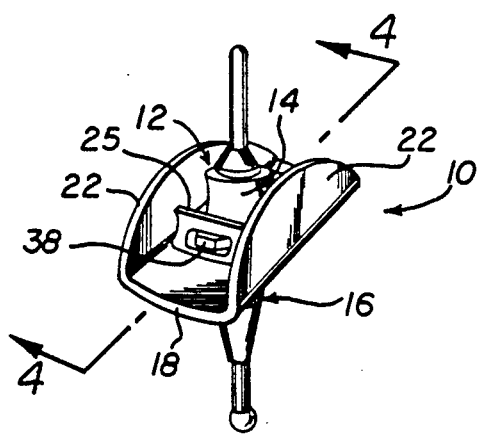
FIG. 2
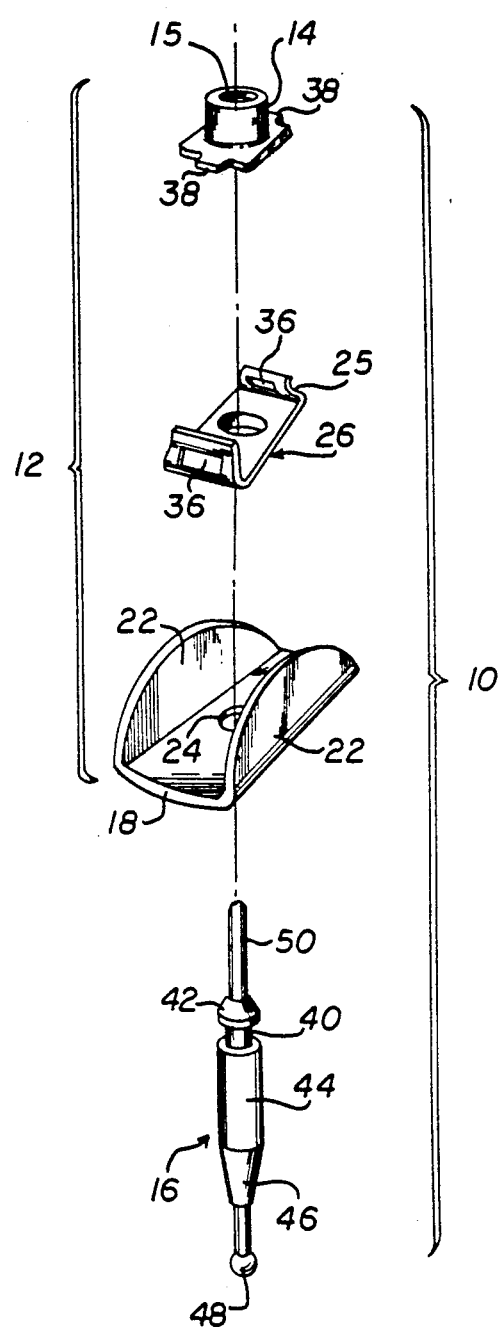
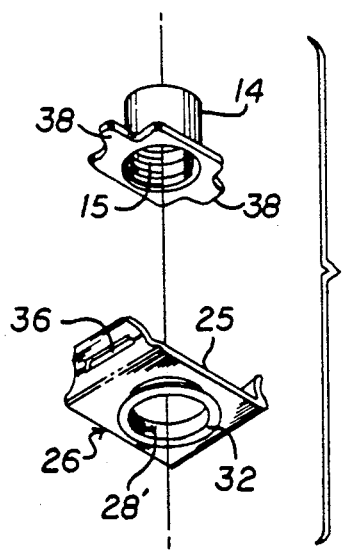
FIG. 3

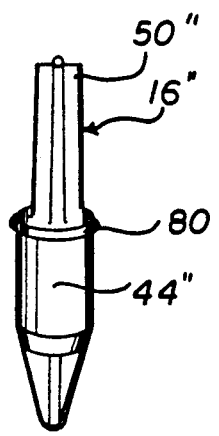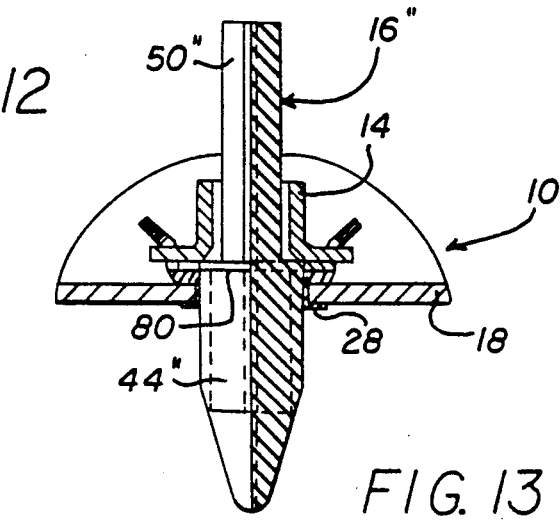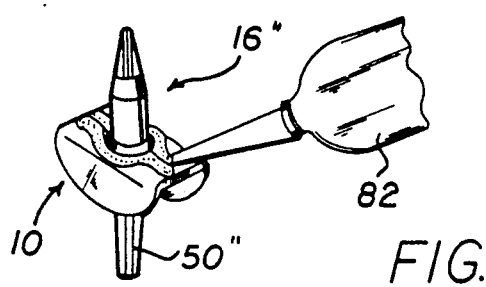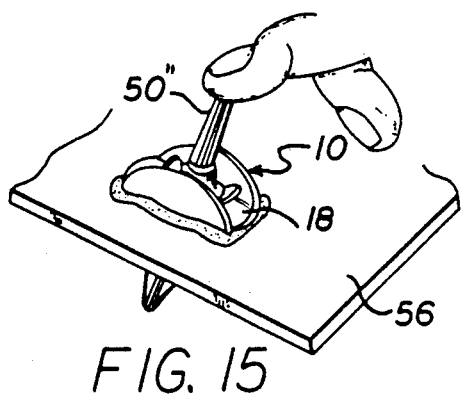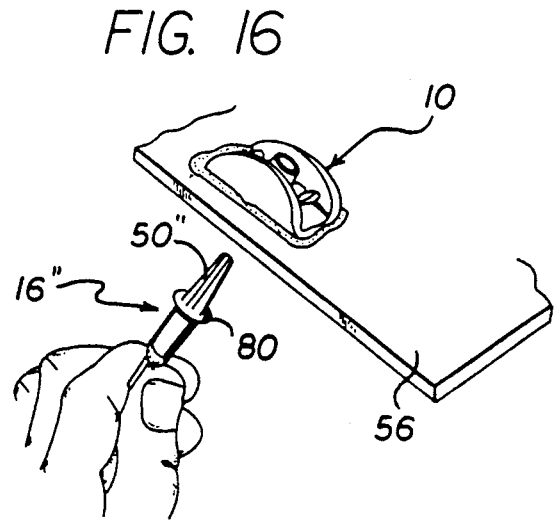

ADHESIVE NUTPLATE ASSEMBLY FOR MOUNTING

BACKGROUND OF THE INVENTION

This invention relates generally to adhesive attachment assemblies and related mounting fixtures and methods of use for securely installing an adhesive attachment onto a supporting surface or substrate. More specifically, this invention relates to an improved adhesive mounted nutplate and related mounting fixture for securely installing the nutplate onto the blind side of a supporting substrate.

A variety of adhesive attachment devices and related fixturing structures are described and claimed in commonly assigned U.S. Pat. Nos. 4,302,492; 4,338,151; 4,390,576; 4,668,546; and 4,778,702. More particularly, these patents describe adhesive attachments such as patches, threaded screw studs, etc., for bonding onto a supporting substrate which can be formed of metal, composite material, or virtually any other material. To achieve a maximum bond strength, fixturing structures in various forms are provided to apply a positive force pressing the attachment against the substrate during at least an initial period of time for curing of a selected adhesive bonding agent at the attachment/substrate interface. However, these prior devices and systems have generally been designed for manipulation of the fixturing structures at the same side of the substrate at which the attachment device is mounted. Convenient adhesive attachment configurations and related fixturing devices for blind side installation have not been provided.

In many manufacturing environments, it is necessary or desirable to install components onto the blind side of a supporting substrate. As one common example, nutplates are well known in the automotive and aerospace industries for use in mounting a threaded nut onto the blind side of a supporting substrate, typically in alignment with an access opening formed in the substrate, to accommodate subsequent reception of a threaded screw or bolt. Such nutplates include a floating or fixed nut carried by a base which is fastened to the substrate normally by one or more rivets extending through rivet ports formed adjacent the access opening. Alternatively, adhesive mounting techniques have been proposed for adhesively bonding the nutplate base onto the substrate, thereby avoiding the need to form additional rivet ports. For optimum bond strength, such adhesive mounting techniques require the nutplate to be pressed against the substrate with a positive force during curing of the adhesive material. While the above-cited reference patents disclose a variety of fixture structures for performing this function, those fixture structures are designed to be mounted and manipulated at the blind side of the substrate. Unfortunately, clearance limitations and other manufacturing assembly parameters at the blind side of the substrate often require removal of the fixture structure before the manufacturing assembly process can proceed. Simple and convenient fixturing devices which can be manipulated and ultimately removed from the front side of the substrate have not been provided.

There exists, therefore, a significant need for an improved nutplate with related installation fixture, wherein the nutplate can be installed onto the blind side of a substrate by a fixture which can be manipulated and later removed from the front side of the substrate. The present invention fulfills these needs and provides further related advantages.

SUMMARY OF THE INVENTION

In accordance with the invention, an improved nutplate assembly with related mounting fixture is provided for quick and easy installation as an adhesive attachment onto the surface of a supporting substrate. The nutplate assembly and fixture are particularly designed for nutplate mounting onto the blind side of the substrate. The fixture is adapted for manipulation to apply a positive force urging the nutplate toward the substrate for at least an initial portion of an adhesive cure period. Following the adhesive cure period, the fixture is adapted for forcible removal from the nutplate by further manipulation from the front or exposed side of the substrate.

The nutplate assembly includes an internally threaded nut member adapted for adhesive mounting onto the blind side of a substrate, in general alignment with an access opening formed in the substrate. The fixture comprises a resilient fixture pin having a neck portion seated relatively snugly within the nut member. The neck portion extends axially through the nut member and is joined at opposite ends thereof respectively to a radially enlarged pulling head and a radially enlarged resilient body. When the nut member is seated upon a blind side of the substrate, with a selected adhesive material at the nut member/substrate interface, the body of the fixture pin extends through the access opening to the front or exposed side of the substrate. In one form, application of a pulling force to the fixture body displaces the pulling head against the nut member to apply a positive force urging the nut member toward the substrate. When the fixture body is released, the material forming the fixture body binds sufficiently within the access opening to maintain the positive force upon the nut member for an adhesive cure period, while simultaneously preventing adhesive flow into the access opening. When the adhesive material has cured sufficiently, the fixture body may be regrasped at the front side of the substrate and forcibly pulled through the nut member for removal therefrom.

One preferred fixture pin includes an elongated narrow tip extending from the pulling head for relatively easy insertion into and through the nut member. A tapered conical leading face on the pulling head accommodates sufficient head deformation for displacement through the nut member to position the neck portion of the fixture pin within the nut member. A trailing face on the pulling head defines a generally radially oriented shoulder bearing axially against the nut member when the appropriate pulling force is applied to the fixture body. The fixture body is joined in turn to a tail portion of relatively smaller diameter for easy lead-in reception through the substrate access opening, when the nut member is mounted onto the substrate.

Application of the pulling force to the fixture body results in sufficient resilient elongation of the fixture body to pass into the access opening. The axial length of the fixture body is sufficiently greater than the axial size of the access opening, such that a leading segment of the body passes beyond the access opening when the nut member is drawn against the blind side of the substrate. When the fixture body is released, the portion within the access opening expands diametrically to bind therein. In addition, the leading segment of the fixture body expands diametrically to lock the fixture against axial retraction. After curing of the adhesive material, the tail portion of the fixture may be regrasped to forcibly draw the fixture through the nut member and access opening.

In one preferred form, the nutplate assembly comprises a floating nutplate of relatively simplified design for mounting with enhanced bond strength onto the blind side of a substrate. More particularly, the nutplate comprises a base having a central opening formed therein. A nut retainer is mounted upon the base and includes an apertured retainer cage formed as a unitary component with a depending cylindrical liner sleeve sized for relatively close fit through the base central opening. A leading edge of this cylindrical liner sleeve is rolled outwardly to define a circumferential lock rim which cooperates with the retainer cage to lock the retainer onto the base. The lock rim further defines a narrow spacer element between the underside of the base and a substrate, thereby achieving minimum adhesive material bond line thickness. An internally threaded nut includes tab means adapted to interlock with the retainer cage in a manner permitting at least minimal nut floating in general alignment with the central opening in the baseplate.

To facilitate mounting of the nutplate assembly, an improved adhesive applicator includes twin nozzles for simultaneous delivery of a selected adhesive material. These nozzles extend in spaced relation and terminate in angled tips extending generally toward each other. This applicator geometry facilitates simultaneous placement of a pair of adhesive beads on the underside of the nutplate base, and on opposite sides of the fixture pin which is preassembled to extend through the nutplate base. When the base is seated upon a substrate, these twin beads are extruded outwardly in opposite directions, to provide a substantially uninterrupted adhesive film at the nutplate/substrate interface.

In accordance with another preferred form of the invention, the fixture is adapted to carry the nutplate assembly and to be pushed from the blind side of the substrate to press the nutplate assembly against the substrate. The fixture includes a resilient body sized to push into and bind within the substrate, in combination with a flange member which holds the nutplate assembly with a positive force against the substrate during an adhesive cure period. After curing of the adhesive, the fixture is adapted to be grasped from the front of exposed side or the substrate for forcible removal from the nutplate assembly.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view illustrating an adhesive mounted nutplate assembly embodying the novel features of the invention;

FIG. 2 is an exploded perspective view illustrating construction details of components forming the nutplate assembly;

FIG. 3 is an exploded perspective view illustrating further construction details of the nutplate assembly components;

FIG. 12 is a perspective view illustrating an alternative fixture configuration;

FIG. 13 is a longitudinal sectional view similar to FIG. 14, but depicting the fixture of FIG. 13 installed within a nutplate assembly;

FIG. 14 is a perspective view similar to FIG. 6, but showing application of adhesive to the nutplate assembly of FIG. 13;

FIG. 15 is a perspective view depicting pressing of the nutplate assembly of FIG. 13 against the blind side of a substrate; and FIG. 16 is a perspective view illustrating forcible removal of the fixture of FIG. 12 from the installed nutplate assembly.

DETAILED DESCRIPTION OF THE PREFERRED EMBODIMENTS

Figure 4:
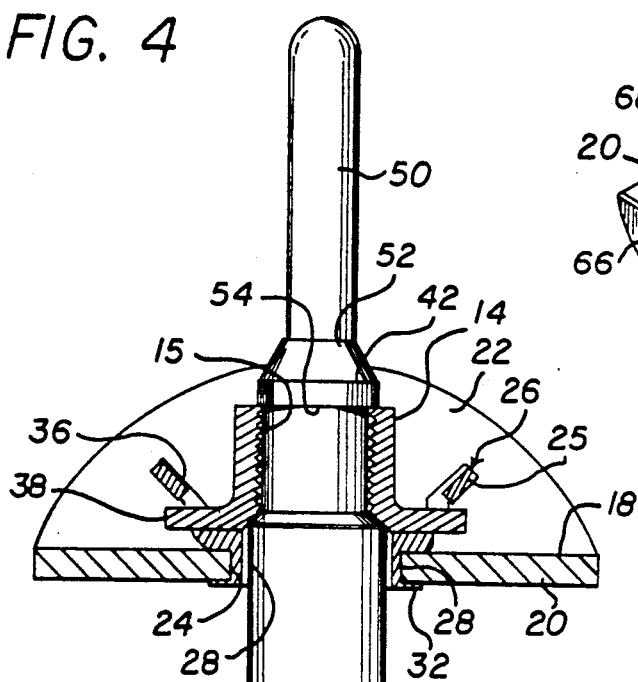
FIG. 4 is an enlarged longitudinal vertical sectional view taken generally on the line 4—4 of FIG. 1.

As shown in the exemplary drawings, an improved adhesive mounted nutplate assembly, referred to generally by the reference numeral 10 in FIG. 1, is provided for secure adhesive mounting onto the blind side of a supporting surface or substrate. The nutplate assembly 10 comprises an improved nutplate 12 having an internally threaded nut 14 or the like, in combination with a resilient fixture pin 16. The fixture pin 16 is designed for manipulation from the front or exposed side of the substrate, to achieve secure adhesive mounting of the nutplate 12 onto the blind side of the substrate. In one alternative form (FIG. 12), a modified fixture is adapted for manipulation at the blind side of the substrate to install the nutplate, followed by subsequent separation from the nutplate by manipulation at the front side of the substrate.

The improved adhesive mounted nutplate assembly 10 of the present invention is designed for secure adhesive installation of an attachment onto the surface of a supporting substrate. The assembly includes means for positively pressing the attachment against the substrate surface for at least an initial portion of cure time for a selected adhesive material interposed between the attachment and the substrate. Accordingly, by virtue of this positive pressing action, the attachment is securely mounted onto the substrate with a substantially maximized adhesive bond strength. The improved nutplate assembly is particularly designed for installing an attachment such as the illustrative nutplate 12 onto a blind side of the substrate, by means of the fixture pin 16 which extends through the substrate to the front or exposed side thereof. The fixture pin 16 is manipulated from the front side of the substrate for positively forcing the nutplate toward the blind substrate side during the adhesive cure period, after which the fixture pin is removable by further manipulation from the front side of the substrate.

The adhesive mounted nutplate assembly 10 is shown in one preferred form in FIGS. 1–4. More specifically, the nutplate 12 comprises a base 18 defining an underside surface 20 for secure adhesive mounting onto a substrate, as will be described. This base 18 is formed from a selected material such as metal or an appropriate composite material or the like, in accordance with compatibility for mounting onto the target substrate. The illustrative drawings show the base 18 in the form of a generally circular disk having opposite side regions 22 turned upwardly to define a pair of generally parallel upstanding wings which assist in retaining the nut 14 against relative rotation, as will be described.

The base 18 has a central opening 24 formed therein. A nut retainer 26 includes an apertured retainer cage 25 formed as a one-piece or integral component, with a generally cylindrical liner sleeve 28 depending from the retainer cage 25 and sized for relatively close tolerance fit through the central opening 24. The lower edge of the liner sleeve 28 is rolled or flared outwardly to define a lock rim 32, which cooperates with the cage 25 to lock the retainer 26 securely onto the base 18. Importantly, this lock rim 32 has a predetermined thickness, such as about 0.010 to 0.020 inch, to provide a spacer element for controlled spacing of the underside surface 20 of the base 18 from a substrate, as will be described.

The retainer cage 25 of the nut retainer 26 includes a pair of upturned flaps defining transversely elongated slots 36 (FIG. 2). These flaps are positioned between the upstanding wings 22 of the base 18, and extend outwardly at appropriate angles to permit snap-fit reception of outwardly projecting tabs 38 formed on the nut 14. Accordingly, depending upon the tightness of fit of the nut tabs 38 within the slots 36, the nut 14 is mounted relatively loosely for at least some floating movement relative to the base 18. When mounted in place, a threaded central bore 15 formed in the nut is generally aligned with a circular opening 28' defined by the liner sleeve 28.

The fixture pin 16 (FIGS. 1–8) comprises an elongated rod-like resilient member which is preassembled with the nutplate 12 to extend through the nut 14 and the base 18. The fixture pin 16 comprises a resilient member designed to support the nutplate with facilitated handling in the course of an installation procedure, and further to prevent fouling of the nut bore 15 or the liner opening 28' with adhesive material. The fixture pin 16 is operated easily from a front side of a target substrate for securely mounting the nutplate onto a blind side of the substrate.

The illustrative fixture pin 16 is formed as a unitary or one-piece molding defining a combination of contoured surfaces. In particular, the fixture pin 16 includes a generally cylindrical neck portion 40 having a size and shape for relatively snug reception through the bore 15 formed in the nut 14. At axially opposite ends of the nut 14, the fixture pin is diametrically enlarged to define a fixture head 42 and a fixture body 44, respectively. The fixture body 44 is sized and shaped to extend from the neck portion 40 with relatively close tolerance through the liner sleeve 28 and is joined integrally with an elongated tail portion 46 of reduced diametric size. A ball shaped knob 48 or the like may be provided at the distal end of the tail portion 46 for facilitated manual grasping. The size of the knob 48 can also define a gauge to prevent use of the fixture with an undersized substrate opening. In contrast, the head 42 at the opposite axially end of the nut 14 is joined to an elongated nose tip 50 of reduced diametric size for use in initial assembly of the fixture pin with the nutplate 12.

More specifically, as viewed in FIG. 4 the nose tip 50 is sized to fit relatively freely through the nut bore 15. The leading end of the nose tip 50 can be appropriately grasped manually or with a suitable tool to pull the diametrically larger head 42 through the liner sleeve 28 and the nut bore 15. This initial assembly is facilitated by forming the head 42 with a conically tapered leading face 52 (FIG. 4) on the head which accommodates head entry through these components and corresponding radial compression. When the head 42 is pulled through the nut 14, the head reexpands to its initial size, thereby orienting a substantially radially extending trailing face 54 in abutting engagement with one axial end of the nut.

The nutplate assembly 10 including the nutplate 12 and the fixture pin 16 is adapted for quick and easy installation onto a substrate 56, as viewed in FIGS. 5–8. In this regard, the nutplate assembly 10 is mounted on the substrate 56 with the nut 14 generally aligned with an access opening 58 formed in the substrate. The tail portion 46 and part of the body portion 44 are adapted to project through and beyond the access opening 58 during the installation procedure.

Figure 5:
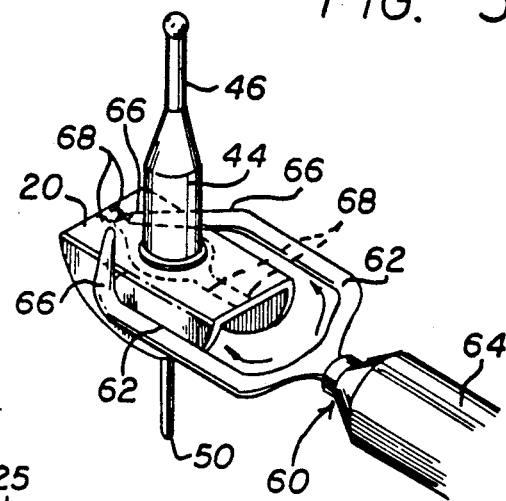
FIG. 5 is a perspective view illustrating an improved adhesive applicator for applying adhesive material to the nutplate assembly.

More specifically, as shown in FIG. 5, a selected adhesive material is applied to the underside surface 20 of the nutplate base 18. This adhesive application step is facilitated by an improved applicator 60 defined by a pair of spaced nozzles 62 for receiving adhesive material from a common reservoir 64. The nozzles 62 extend from the reservoir 64 generally in parallel and terminate in angled nozzle tips 66 which extend generally toward each other in closely spaced relation. As viewed in FIG. 5, these nozzle tips facilitate application of an adjacent pair of adhesive beads 68 onto the underside surface 20 of the nutplate base 18. These beads 68 extend in parallel and curve around opposite sides of the body portion 44 of the fixture pin 16, by virtue of forming the nozzle tips 68 from a plastic material or the like with sufficient resiliency to separate slightly as the beads 68 are applied generally along a mid-line of the base underside 20.

Figure 6:
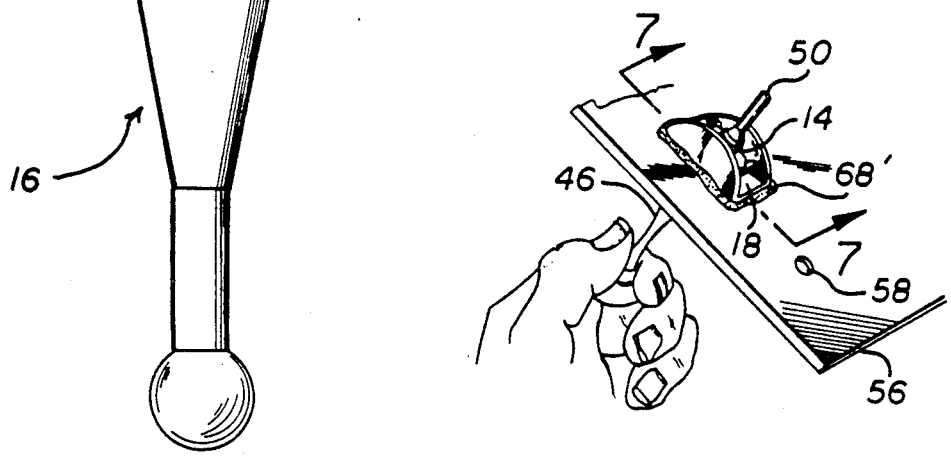
FIG. 6 is a fragmented perspective view illustrating initial placement of the nutplate assembly onto the blind side of a selected substrate.
Figure 8:
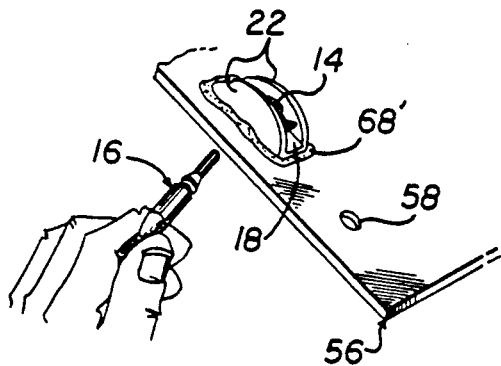
FIG. 8 is a fragmented perspective view similar to FIG. 6, but depicting forcible removal of an installation fixture from an adhesive mounted nutplate.

As shown in FIG. 6, the nutplate assembly 10 is then installed onto the blind side of the substrate 56, with the tail portion 46 projecting through a selected access opening 58 in the substrate. In this regard, the tail portion 46 is sized for relatively easy and unrestricted entry through the access opening 58 to the front or exposed side of the substrate. The thus-exposed tail portion 46 is grasped easily and pulled to draw the body 44 of the fixture pin into the access opening 58. In this regard, the body 44 has an unstressed diametric size which is at least slightly larger than the diametric size of the access opening 58. Accordingly, sufficient pulling force must be applied to the body portion to elongate the resilient fixture pin structure and correspondingly draw down its diametric size for passage through the access opening. Continued pulling action draws the trailing face 54 of the fixture head 42 against the nut 14 in a manner to press the underside surface 20 of the base 18 firmly and positively against the blind side of the substrate. When this occurs, at least a portion of the fixture body 44 protrudes beyond the front plane of the substrate 56.

Figure 7:
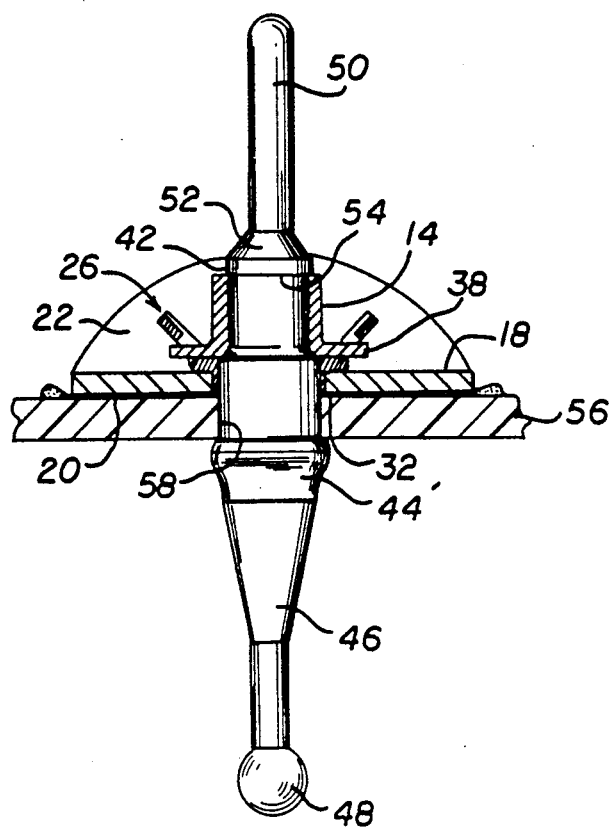
FIG. 7 is an enlarged fragmented vertical sectional view taken generally on the line 7—7 of FIG. 6.

The above-described pressing action forces the nutplate base 18 firmly against the blind side of the substrate. This action extrudes the adhesive beads 68 into a smooth, substantially homogeneous film 68' of predetermined thickness, as defined by the thickness of the lock rim 32 on the nut retainer 26 (FIG. 7). When the base 18 is drawn against the substrate with a sufficient and/or predetermined pulling force, the tail portion 46 of the fixture pin may be released for at least an initial portion of an adhesive cure period. Upon such release, the region of the fixture body 44 disposed within the access opening 58 tends to expand diametrically to bind therein. This binding action cooperates with diametric expansion of a forward segment 44' of the body 44 disposed beyond the substrate front plane, to maintain the pulling force without fixture pin retraction relative to the substrate. The fixture pin 16 can thus remain for a portion or all of the adhesive material cure period to ensure optimum bond strength attachment of the base 18 to the blind side of the substrate.

After sufficient curing of the adhesive material, the fixture pin 16 can be removed from the nutplate 12 entirely by manipulation from the front side of the substrate. More specifically, the tail portion of 46 is easily regrasped manually (FIG. 8) or with an appropriate tool, and then advanced with a stronger pulling action sufficient to deform the head 42 for drawing passage through the nut and aligned openings in the base 18 and substrate 56. Importantly, however, the fixture pin 16 has remained in place for sufficient curing of the adhesive material which now locks the nutplate onto the substrate with a bond strength exceeding the force required to separate the fixture pin. Moreover, during adhesive curing, the neck portion 40 and the fixture body 44 cooperatively block adhesive material flow into or fouling of the nut bore 15 or the liner sleeve 28.

Although the particular resilient material used for the fixture pin 16 may vary, the material parameters are chosen in relation to the size parameters to achieve the above-described functional operation. That is, the fixture pin 16 deforms with sufficient ease to accommodate initial assembly with the nutplate 12. The pin 16 then provides sufficient pull strength and elasticity to prevent pin retraction through a substrate opening 58, thereby maintaining a desired pulling force during curing of the adhesive material. Finally, the fixture pin 16 is adapted for deformation in response to a stronger pulling force to permit forced separation from the adhesively mounted nutplate. In one preferred form, the fixture pin was formed from a silicone rubber material having about 40 Shore A hardness.

After mounting of the nutplate 12 and removal of the fixture pin 16, a threaded screw or bolt (not shown) can be installed quickly and easily by threaded advancement from the front side of the substrate into engagement with the nut 14. As is known in the art, the nut 14 is desirably mounted with sufficient floating for self-centering engagement with a threaded fastener. Rotation of the nut 14 relative to the substrate is prevented by the locked mounting of the retainer 26 and/or by the upstanding base wings 22 which prevent retainer rotation.

Figure 9:
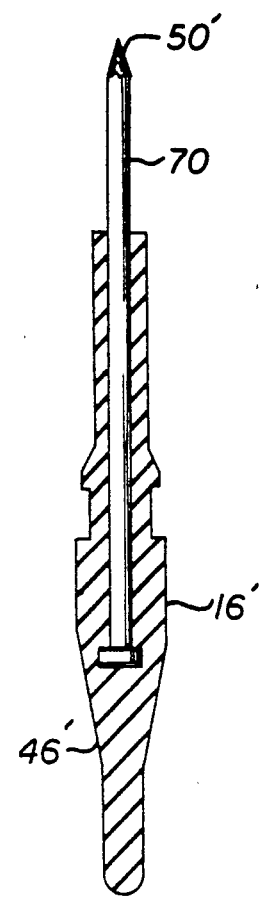
FIG. 9 is a fragmented vertical sectional view illustrating one alternative fixture geometry.

One alternative fixture pin geometry is shown in FIG. 9, wherein a modified fixture pin 16' is formed from a resilient material comolded about an internal rigid rod member 70 such as a nail or the like. The pointed tip end of the nail 70 protrudes upwardly as a nose tip 50' to provide a rigid element facilitating initial entry and assembly with a nutplate. The remaining components of the fixture pin 16' may correspond generally with those described previously with respect to FIGS. 1-8.

In use, the fixture pin of FIG. 9 may be seated within a substrate opening during an adhesive cure period, and later removed by pulling from the front side of the substrate, all as described with respect to FIGS. 1-8. Alternatively, if desired, the rigid rod member 70 permits a tail portion 46' to be pushed through a substrate opening to seat the nutplate or the like against the substrate for an adhesive cure period. Thereafter, the fixture pin can be pulled and removed as previously described from the front side of the substrate.

Figure 10:
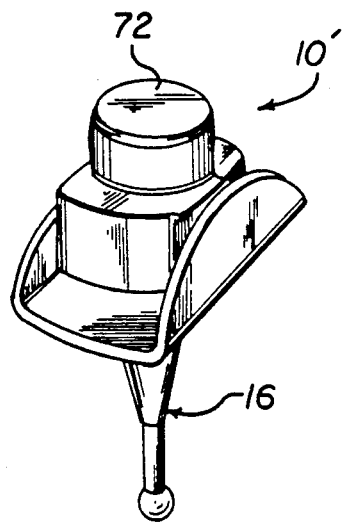
FIG. 10 is a perspective view similar to FIG. 1, but depicting one alternative nutplate geometry.
Figure 11:
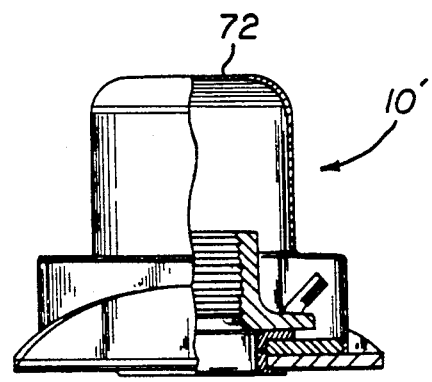
FIG. 11 is an enlarged side elevation view, shown partially in vertical section, of the nutplate shown in FIG. 10.

Another alternative form of the invention is shown in FIGS. 10 and 11, wherein a seal cap 72 is included as part of a modified nutplate assembly 10'. In this version, a nutplate 12' is preassembled with a fixture pin 16 generally as shown in FIGS. 1-8. However, the seal cap 72 encloses the blind side of the nut 14 and retainer 26, thereby preventing outgassing or other gas leakage through the assembly Accordingly, when the nutplate 12' is mounted onto a substrate, an appropriate threaded fastener or bolt can be attached to the nut 14, without creating a gas leakage path through the substrate.

Another alternative fixture pin geometry is shown in FIGS. 12-16, wherein a resilient fixture pin 16" is again provided to be pushed against a blind side of a substrate to install a nutplate assembly, such as the nutplate assembly 10 as described with respect to FIGS. 1-8. More particularly, in this embodiment, the fixture pin 16" includes a cylindrical body 44" adapted to fit and bind within the liner sleeve 28 of the nutplate assembly. A radially enlarged spring flange 80 is formed at one end of the body 44" to separate the fixture body from a nose tip 50" of x-shaped cross section or the like to fit relatively easily through the nut 14.

The fixture pin 16" is assembled with the nutplate assembly 10 by pressing the nose tip 50" upwardly through the nutplate base 18 and the nut 14 until the spring flange 80 seats axially between the liner sleeve 28 and the nut 14. In this position, the fixture body 44" is snugly fitted into the base of the liner sleeve to prevent entry of adhesive material (FIG. 13).

The assembled fixture pin 16" and nutplate assembly 10 are then installed onto a substrate as viewed in FIGS. 14-16. Adhesive material is applied to the underside of the nutplate base 18 (FIG. 14) with a suitable applicator 82, although the same applicator shown in FIG. 5 may be preferred. The nutplate assembly 10 is then pressed against the blind side of a substrate 56 by pushing against the nose tip 50" of the fixture pin (FIG. 15). Such action pushes the leading end of the body 44" through an opening (not shown) in the substrate 56 to bind therein in the same manner as described with respect to FIG. 6. The leading end of the body 44" is conveniently tapered to facilitate entry into the substrate opening. This binding action of the pin body 44" holds the spring flange 80 tightly against the liner sleeve 28 to positively press the nutplate against the substrate as the adhesive material cures, after which the fixture pin 16" can be forcibly removed from the front side of the substrate (FIG. 16) in the same manner as previously described. While manual installation of the nutplate assembly is shown in FIG. 15, it will be understood that automated installation equipment can be used. Moreover, it will be understood that the spring flange 80 is sufficiently compliant or deformable to apply the desired force to the nutplate during an adhesive cure cycle yet accommodate forcible inversion for removal as viewed in FIG. 16.

A variety of further modifications and improvements to the nutplate and related fixture pin will be apparent to those skilled in the art. Accordingly, no limitation on the invention is intended by way of the foregoing description or accompanying drawings, except as set forth in the appended claims.

What is claimed is:

1. An attachment assembly for adhesive mounting onto a substrate having a front side and a blind side and an access opening extending therebetween, said attachment assembly comprising:
   an attachment having an underside surface and adhesive means for adhesive mounting of said attachment onto the blind side of the substrate; and
   a fixture pin having a neck portion extending through a central opening formed in said attachment and joined at one end thereof to a diametrically enlarged body disposed generally at one end of said attachment central opening;
   said body having a length to extend substantially through the substrate access opening and having a diametric size and being manipulatable for substantial binding within the substrate access opening to force and retain said underside surface of said attachment against the blind side of the substrate, said body being manipulatable to permit forced removal from the attachment by pulling the body at the front side of the substrate.

2. The attachment assembly of claim 1 wherein said fixture pin is formed from a resilient material adapted for forced removal from said attachment by pulling from the front side of the substrate.

3. The attachment assembly of claim 1 wherein said body retains the attachment underside surface against the blind side of the substrate substantially without requiring any portion of said attachment to protrude into the substrate access opening.

4. The attachment assembly of claim 1 wherein said body has a length to extend through the substrate access opening and project at least a short distance from the front side of the substrate when the attachment underside surface is forced against the blind side of the substrate.

5. The attachment assembly of claim 1 wherein said fixture pin further includes a diametrically enlarged head at an opposite end of said neck portion relative to said body.

6. The attachment assembly of claim 1 wherein said fixture pin further includes a tail extending generally coaxially from said body at the end thereof opposite said neck portion, said tail having a reduced diametric size relative to said body.

7. The attachment assembly of claim 6 wherein said tail has a distal end, and further including an enlarged knob at said distal end.

8. The attachment assembly of claim 5 wherein said fixture pin further includes a nose tip extending generally coaxially from said head at the end thereof opposite said neck portion, said nose tip having a reduced diametric size relative to said head.

9. The attachment assembly of claim 8 wherein said head defines a tapered leading surface blending with said nose tip to permit pull-in entry into and passage through said attachment central opening, and a trailing surface defined by a generally radially oriented shoulder for abuttingly engaging one axial end of said attachment when said neck portion is positioned within said attachment central opening.

10. The attachment assembly of claim 1 wherein said neck portion is sized for snug fit within said attachment central opening.

11. The attachment assembly of claim 1 wherein said fixture pin comprises a resilient material having a rigid rod member encased therein.

12. The attachment assembly of claim 1 wherein said attachment comprises a nut member, and wherein said attachment central opening comprises a threaded bore formed in said nut member.

13. The attachment assembly of claim 1 wherein said attachment comprises a nutplate.

14. The attachment assembly of claim 13 wherein said nutplate comprises a base having a central opening therein and defining said underside surface, a retainer mounted on said base, and a nut having a threaded bore formed therein, said retainer and nut including cooperating means for supporting said nut relative to said base with said bore generally aligned with said base central opening.

15. The attachment assembly of claim 14 wherein said retainer comprises a retainer cage having means for supporting said nut, a generally cylindrical liner sleeve extending through said base central opening, and a radially expanded lock rim at one end of said liner sleeve for locking said retainer onto said base.

16. The attachment assembly of claim 14 further including a seal cap mounted on said base and substantially enclosing said retainer and said nut.

17. The attachment assembly of claim 1 wherein said fixture pin includes a radially enlarged spring flange interposed between said neck portion and said body.

18. An attachment assembly for adhesive mounting onto a substrate having a front side and a blind side and an access opening extending therebetween, said attachment assembly comprising:
   an attachment having an underside surface for adhesive mounting onto the substrate; and
   a fixture pin having a neck portion extending through a central opening formed in said attachment;
   said neck portion being interposed between a relatively diametrically enlarged head and relatively diametrically enlarged body disposed respectively at axially opposed ends of said attachment;
   said head being joined to a comparatively smaller diameter nose tip at one end of said head opposite said neck portion, said head defining a generally conically tapered surface blending with said nose tip and being formed from a resilient material to permit said nose tip to be inserted into and pulled through said attachment central opening to pull said head through said attachment central opening, said head further defining a generally radially oriented shoulder at the juncture between said head and neck portion for axially abutting said attachment when said neck portion is positioned within said central opening;
   said body being formed from a resilient material and having a length to extend through the substrate access opening from the blind side to the front side and to be manipulated by pulling at the front side to draw the underside surface of the attachment against the substrate blind side, said body further having a diametric size to bind within said substrate access opening to maintain forces drawing the attachment underside surface against the substrate for at least an initial cure period for curing of an adhesive material interposed between the attachment underside surface and the substrate blind side;

said head being sufficiently resilient to permit forced removal from the attachment by pulling the body at the front side of the substrate.

19. The attachment assembly of claim 18 wherein the fixture pin further includes a comparatively smaller diameter tail projecting from said body at one end thereof opposite said neck portion.

20. The attachment assembly of claim 18 wherein said fixture pin comprises a resilient material having a rigid rod member encased therein.

21. An attachment assembly for adhesive mounting onto a substrate having a front side and a blind side and an access opening extending therebetween, said attachment assembly comprising:

an attachment having an underside surface for adhesive mounting of said attachment onto the substrate; and a fixture pin having a neck portion extending through a central opening formed in said attachment;

said fixture pin further including a diametrically enlarged body at one end of said neck portion, and a diametrically enlarged spring flange;

said body being formed from a resilient material and having a length to extend through the substrate access opening from the blind side to the front side and to be manipulated to draw said spring flange against the attachment to force the attachment underside surface against the blind side of the substrate, said body further having a diametric size to bind within said substrate access opening to maintain forces drawing the attachment underside surface against the substrate for at least an initial cure period for curing of an adhesive material interposed between the attachment underside surface and the substrate blind side, said body being further manipulatable to permit forced removal from the attachment by pulling the body at the front side of the substrate.

22. The attachment assembly of claim 21 wherein said spring flange is axially interposed between said neck portion and said body, said flange having a diametric size larger than said body.

* * * * *